K. CHEN.
CAMERA.
APPLICATION FILED MAY 24, 1919.

1,339,319. Patented May 4, 1920.

WITNESSES

INVENTOR
KUNG CHE CHEN
BY
ATTORNEYS

UNITED STATES PATENT OFFICE.

KUNGCHE CHEN, OF SHANGHAI, CHINA.

CAMERA.

1,339,319.    Specification of Letters Patent.    Patented May 4, 1920.

Application filed May 24, 1919. Serial No. 299,575.

*To all whom it may concern:*

Be it known that I, KUNGCHE CHEN, a citizen of the Republic of China, and a resident of Shanghai, China, have invented certain new and useful Improvements in Cameras, of which the following is a specification.

My present invention relates generally to cameras and more particularly to cameras of the reflex type and has for its principal object the provision of certain means whereby in case of necessity a wide angle lens may be employed.

It is well known that in cameras of the reflex type, wherein the image is transferred by an angle mirror upon a horizontal ground glass, wide angle lenses cannot be used. The lens in such cameras as now constructed must be sufficiently in front of the mirror to permit the latter to swing through its arc of movement as an exposure is being made. This fact precludes a wide angle lens and thus renders the camera ineffective for the occasional instances where a wide angle lens becomes necessary.

My present invention aims to overcome this difficulty and permit of use of a wide angle lens with the least possible disturbance as far as the ordinary parts are concerned, and with minimum change to the shape, size and appearance of the camera.

With these objects in mind, my invention consists in the features to be now described with respect to the accompanying drawing, which forms a part of this specification and in which—

Figure 1:
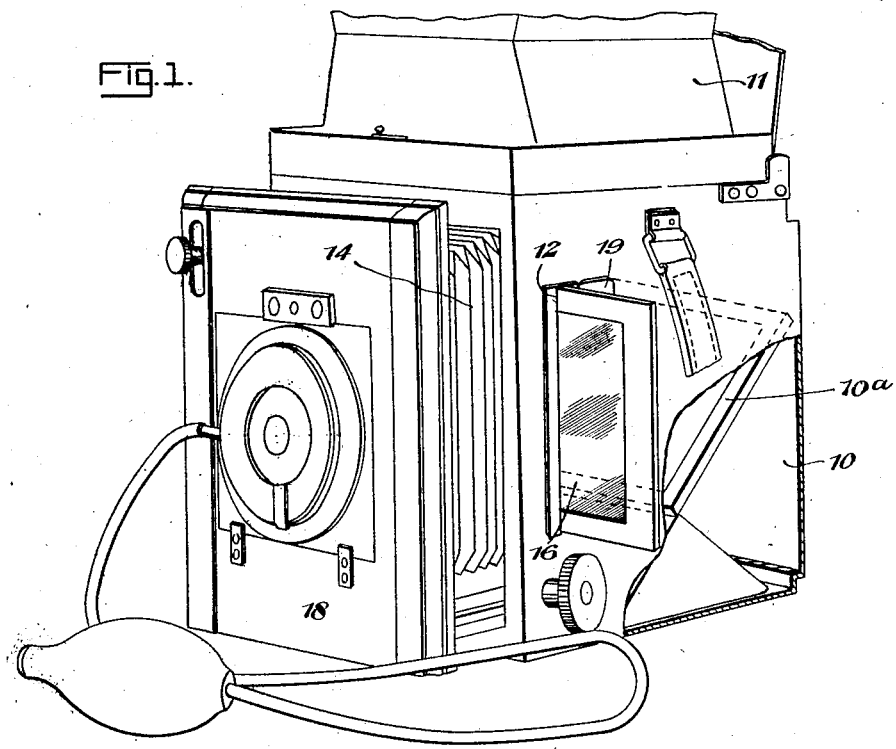
Figure 2:
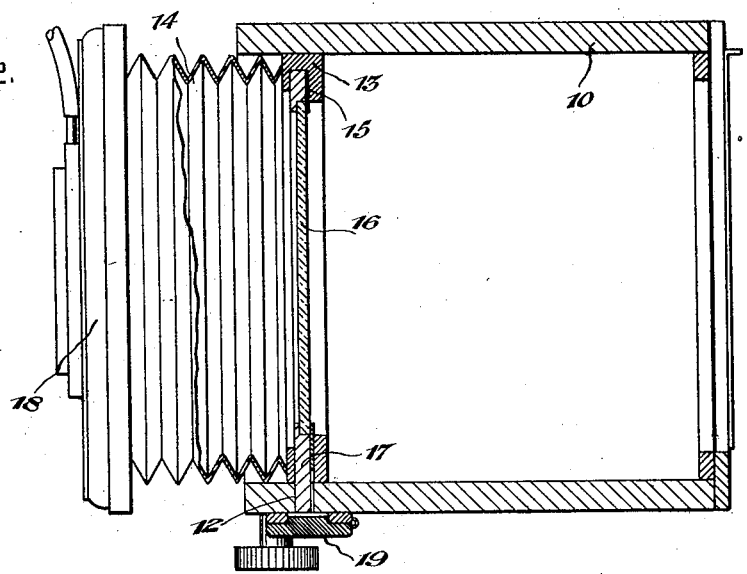

Figure 1 is a perspective view of a camera of the reflex type, provided with my improvements, and Fig. 2 is a horizontal section taken therethrough.

Referring now to these figures, I have shown a camera of the reflex type at 10, a portion of the focusing hood being indicated at 11. Cameras of this type are well known at the present time and embody plate, film pack or roll film holders at the rear thereof, rearwardly of the angularly disposed mirror which reflects the image into a ground glass at the base of the hood 11. No attempt has been made to illustrate these conventional and well known features in the camera casing beyond indication of the mirror at 10ª partly in dotted lines in Fig. 1 and they are referred to simply to identify the particular type of camera wherein the parts mentioned, especially the mirror, preclude at present the use of a wide angle lens. This is also well known and appreciated in the art as one of the disadvantages of a camera of this type. The disadvantage referred to arises from the fact that the lens must be spaced forwardly from the plate or film a sufficient distance to permit the mirrors to swing upwardly toward the ground glass of the hood 11 when an exposure is being made.

According to my present improvements, the casing of the camera 10 is provided at one side with a vertically slotted opening 12 forwardly of the mirror and opposite one side of the usual partition 13 to which the inner portion of the bellows 14 is anchored. This partition 13 is slotted similarly to the camera casing at its side next to the camera slot 12 and is grooved internally around its other three sides as seen at 15 in Fig. 2, so as to provide for the reception of a ground glass 16 in a frame 17 or a conventional plate holder (not shown).

In this way the lens of the lens board 18 may be brought into close proximity with the sensitized surface and a wide angle lens effectively utilized.

The casing of the camera 10 carries a hinged cover 19 which normally closes the slot 12 and it is thus obvious that my invention will not interfere with the ordinary use of the camera, but will simply supplement its action and increase its range of use.

It is, of course, obvious that in utilizing my invention the image is focused on the ground glass 16 through the open rear end of the casing, with the reflecting mirror elevated and it is furthermore obvious that it requires a shutter mechanism of the between-lens type as distinguished from a focal plane shutter utilized by some cameras of this type. Even in these last mentioned cameras the focal plane shutters may be set in " open " position, however, and temporary use made of a between-lens shutter for the purpose of my invention.

I claim as my invention:

1. A camera of the reflex type having a casing and an elevatable reflecting mirror, said casing being provided with a vertically slotted opening at one side between the lens and the mirror, for the reception of a plate holder or a focusing glass, and a cover for normally closing said opening as described.

2. A camera of the reflex type having a casing, lens, and elevatable reflecting mirror, said casing being provided with a slotted opening at one side between the lens and mirror for the reception of a plate holder or a focusing glass, means within the casing to support a plate holder, or a focusing glass, and means for normally covering said opening.

3. A camera of the reflex type having a casing, lens, bellows and elevatable reflecting mirror, said casing having an opening at one side between the lens and mirror for the reception of a plate holder or a focusing glass, a partition within the casing to which the bellows is attached, having grooves opposite the opening to receive and support a plate holder or a focusing glass, and means for normally closing said casing opening.

4. A camera of the reflex type having a casing and an elevatable reflecting mirror in the rear portion thereof, said casing being provided with a side opening through which a plate holder or a focusing glass may be inserted, and a cover hinged to the casing side for normally closing said opening.

5. A camera of the reflex type having a casing, a lens, and a reflecting mirror, said camera being provided with normally inactive means located between the lens and mirror for the reception and support of a focusing glass or a sensitized element, as described.

KUNGCHE CHEN.